United States Patent
Hoffmann et al.

[15] 3,682,943
[45] Aug. 8, 1972

[54] ALKYL ESTERS OF O-THIAZOLOTRIAZOLYL PHOSPHORIC AND PHOSPHONIC ACIDS AND AMIDES, AND THIONO COUNTERPARTS

[72] Inventors: Hellmut Hoffmann, Wuppertal-Elberfeld; Ingeborg Hammann, Cologne, both of Germany

[73] Assignee: Farbenfabriken Bayer Aktiengesellschaft, Leverkusen, Germany

[22] Filed: Aug. 12, 1970

[21] Appl. No.: 63,271

[52] U.S. Cl..................260/306.7, 424/200
[51] Int. Cl...............................C07d 99/06
[58] Field of Search.......................260/306.7

[56] References Cited

UNITED STATES PATENTS 3,428,645   2/1969   Greco...................260/306.7

*Primary Examiner*—Alex Mazel
*Assistant Examiner*—R. J. Gallagher
*Attorney*—Burgess, Dinklage & Sprung

[57] ABSTRACT

O,O-dialkyl or -aryl-O-[5-methyl-thiazolo-(3,2-b)-triazol-2-y/]-phosphoric acid esters and thionophosphoric acid esters as well as their phosphonic and phosphinic acid counterparts and amido esters having the formula

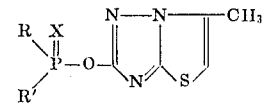

wherein R and R' are alkyl, alkoxy, alkylamino or phenyl, which possesss arthropodicidal, e.g., insecticidal and acaricidal, properties, and process for their preparation.

9 Claims, No Drawings

ALKYL ESTERS OF O-THIAZOLOTRIAZOLYL PHOSPHORIC AND PHOSPHONIC ACIDS AND AMIDES, AND THIONO COUNTERPARTS

The present invention relates to and has for its objects the provision of particular new 0,0-dialkyl or -aryl-O-[5-methyl-thiazolo-(3,2-b)-S-triazol-2-yl]-phosphoric acid esters and thionophosphoric acid esters as well as their phosphonic and phosphinic acid counterparts and amido esters which possess arthropodicidal, especially insecticidal and acaricidal, properties, active compositions in the form of mixtures of such compounds with solid and liquid dispersible carrier vehicles, and methods for producing such compounds and for using such compounds in a new way, especially for combating pests, e.g., arthropods, with other and further objects becoming apparent from a study of the within specification and accompanying examples.

In U.S. Pat. specification No. 2,754,244 there are described, among other things, methylpyrazolo-phosphoric acid esters and their thiono analogues, for example, 0,0-diethyl-0-[3-methyl-pyrazolyl-(5)]-thionophosphoric acid ester, which possess insecticidal and acaricidal activity.

The present invention provides triazolo-thiazole esters of phosphoric, phosphonic and phosphinic acids and of the corresponding thiono acids, the said esters having the general formula

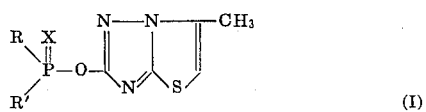

in which each of R and R', which may be the same or different, stands for a straight-chain or branched alkyl, alkoxy or alkylamino radical with, in each case, one to six carbon atoms, or a phenyl group, and X stands for an oxygen or sulphur atom.

The compounds of the general formula (1) exhibit strong insecticidal, acaricidal and fungicidal properties.

The present invention also provides a process for the production of the triazolo-thiazole esters of the general formula (1), in which a halide of phosphoric, phosphonic or phosphinic acid, or of a corresponding thiono acid, of the formula

in which

R, R' and X possess the meanings stated above, and Hal stands for a halogen atom, is reacted with (a) 2-hydroxy-5-methylthiozolo(3,2b)-s-triazole of the formula

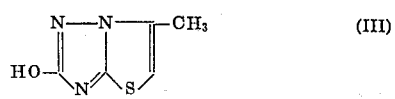

in the presence of an acid acceptor or (b) a salt of the hydroxy triazolothiazole of the formula (III).

Surprisingly, the triazolo-thiazole esters of the present invention, compared with the known methyl-pyrazolo ester of phosphoric acid and thiono phosphoric acid of analogous constitution and the same direction of activity, possess a considerably higher pesticidal, in particular insecticidal and acaricidal, activity. The compounds of the present invention therefore represent a genuine enrichment of the art.

If 2-hydroxy-5-methylthiazolo(3,2-b)-s-triazole and 0-ethylethanethionophosphonic acid ester chloride are used as the starting materials, the reaction course can be represented by the following equation:

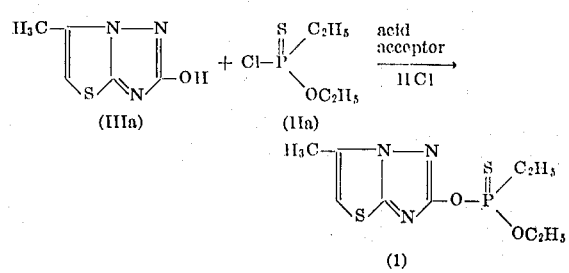

The starting materials to be used are generally defined by the formulae (II) and (III). Preferably, however, R stands for lower alkoxy especially with one to four carbon atoms, R' preferably stands for lower alkoxy, lower alkylamino especially with, in each case, one to four carbon atoms, phenyl, methyl or ethyl, and Hal is preferably a chlorine atom.

As examples of the phosphoric, phosphonic and phosphinic acid halides and the corresponding thiono acid halides which can be used, there are mentioned in particular: 0,0-dimethyl-, 0,0-diethyl-, 0,0-di-isopropyl-, 0,0-dibutyl-, 0-methyl-0-ethyl-, 0-ethyl-0 -isopropyl-, 0-methyl-0-isopropyl-phosphoric acid ester chloride or bromide and the thiono analogues; 0-methyl-methane-(ethane-, -phenyl)-, Oethyl methane-(ethane-, -phenyl)-, 0-isopropyl-methane- (ethane-, -phenyl)-and 0-butyl-methane-(ethane-, -phenyl)-phosphonic acid ester chloride or bromide and the thiono analogues; 0-methyl-N-methyl-, 0-ethyl-N-methyl-, 0-isopropyl-N-methyl-, 0-ethyl-N-isopropyl-, 0-ethyl-N-ethyl-, 0-butyl-N-ethyl-phosphoric acid ester amide chloride or bromide and the thiono analogues; N-methyl-methane-(ethane-, -phenyl)-, N-ethyl-methane-(ethane-, -phenyl)-, N-isopropyl-methane-(ethane-, -phenyl)-and N-butyl-methane(ethane-, -phenyl)-phopshonic acid amide chloride or bromide and their thiono analogues.

The acid halides of the general formula (II) used as starting materials are described in the literature and are obtainable according to known methods.

The 2-hydroxy-5-methylthiazolo(3,2-b)-s-triazole of the formula (III) can be prepared by the reaction of the compound of the formula

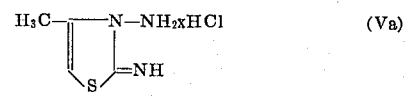

with chloroformic acid methyl ester in the presence of a solution of sodium hydroxide to give the compound of the formula

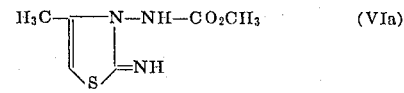

which, on reaction with sodium methylate, gives the sodium salt of the desired triazolo-thiazole derivative of the formula (III).

The process for the preparation of the triazolothiazole esters of phosphoric, phosphonic and phosphinic acids, and of the corresponding thiono acids, of the formula (I) is preferably carried out in the presence of a solvent or diluent.

As such, practically all inert organic solvents are suitable, such as aliphatic and aromatic hydrocarbons (which may be chlorinated), for example, benzene, toluene, xylene, benzine, methylene chloride, chloroform, carbon tetrachloride, chlorobenzene; ethers, for example, diethyl ether, dibutyl ether and dioxane; ketones, for example, acetone, methylethyl ketone, methylisopropyl ketone and methylisobutyl ketone; and nitriles, such as acetonitrile.

Furthermore, the reaction employing the compound of the formula (III) is — as already mentioned above — caused to proceed in the presence of an acid acceptor. For this purpose, all customary acid-binding agents can be used. Particularly suitable, however, are alkali metal carbonates and alcoholates, such as sodium or potassium carbonate, methylate or ethylate; furthermore, aliphatic, aromatic or heterocyclic amines, for example, triethylamine, dimethylamine, dimethylaniline, dimethyl-benzylamine or pyridine, may be used.

Instead of working in the presence of acid-binding agents, it is equally possible first to prepare a salt, preferably an alkali metal or ammonium salt, of the hydroxy-triazolothiazole derivatives of the formula (III) and then triazolothiazole derivatives of the formula (III) and then to react the salt with an acid halide of the formula (II).

When carrying out the reaction, the temperature can be varied within a fairly wide range. In general, the work is carried out at 0° to 80° C preferably at 40° to 50° C. The reaction is usually carried out at normal pressure.

When carrying out the process according to the invention, the starting materials are, in most cases, used in equimolar proportions. An excess of one or other of the reactants brings no substantial advantages. The reaction is expediently effected in one of the abovementioned solvents or diluents in the presence, where necessary, of an acid acceptor at a temperature within the stated preferred range; the reaction mixture is subsequently further stirred for some hours and is then worked up according to customary methods.

The new substances according to the invention are obtained, in most cases, in the form of colorless to slightly yellow-colored, viscous, water-insoluble oils which cannot be distilled without decomposition, but which can, however, by so-called "slight distillation," that is by heating to moderately elevated temperatures under reduced pressure for a sufficiently long period, be freed from the last volatile components and thereby purified. Their refractive indices serve for identification. Some of the compounds are also crystalline substances and are, in such cases, characterized by their melting points.

As already mentioned the new products are distinguished by outstanding insecticidal and acaricidal activity, particularly against sucking and biting insects as well as mites. In addition, they also possess fungicidal properties and, moreover, only a slight phytotoxicity. The pesticidal effect sets in rapidly and is long-lasting.

For these reasons, the compounds according to the invention may be used with success for the control of plant pests, household pests and pests of stored products, particularly against noxious sucking and biting insects, Diptera and mites (Acarina).

Similarly, they may be used against ectoparasites in veterinary medicine.

To the sucking insects there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the mealy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*), and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus and* and *Nephotettix bipunctatus;* and the like.

In the case of the biting insects, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kunniella*) and greater wax moth (*Galleria mellonella*); and the like.

Also to be classed with the biting insects are beetles (Coleoptera), for example the granary weevil (*Sitophilus granarius=Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius = Acanthoscelides obtectus*), the leather beetle (*Dermestes frischi*), the khapra beetle (*Trogoderma granarium*( ), the flour beetle (*Tribolium castaneum*), the northern corn billbug (*Calandra or Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (Agriotes spec.) and larvae of the cockchafer (*Melolontha melolontha*) cockroaches, such as the German cockroach (*Blattella germanica*), American cockroach (*Periplaneta americana*), Madeira cockroach (*Leucophaea oror Rhyparobia madeirae*), Oriental cockroach (*Blatta orientalis*), the giant cockroach (*Blaberus giganteus*) and the black giant cockroach (*Blaberus fuscus*) as well as Henschoutedenia flexivitta; further, Orthoptera, for example the house cricket (*Acheta domesticus*); termites such as the eastern subterranean termite (*Reticulitermes flavipes*) and Hymenoptera such as ants, for for example the garden ant (*Lasius niger*) and the like.

The Diptera comprise essentially the flies, such as the vinegar fly (*Drosophila melanogaster*), the Mediterranean fruit fly (*Ceratitis capitata*), the house fly (*Musca domestica*), *the little house fly* (*Fannia canicularis*), the black blow fly (*Phormia aegina*) and bluebottle fly (*Calliphora erytrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) there are classed, in particular the spider mites (Tetranychidae) such as the two-spotted spider mite (*Tetranychus telarius = Tetranychus althaeae* or *Tetranychus urticae*) and the European red mite (*Paratetranychus pilosus = Panonychus ulmi*), blister mites, for example the currant blister mite (*Eriophyes ribis*) and the tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When applied against household pests and pests of stored products, particularly flies and mosquitoes, the compounds of the present invention are also distinguished by an outstanding residual activity on wood and clay as well as good stability to alkali on limed substrates.

The active compounds according to the instant invention can be utilized, if desired, in the form of the usual formulations or compositions with conventional inert (i.e., plant compatible or herbicadally inert) pesticidal diluents or extenders, i.e., diluents or extenders of the type usable in conventional pesticidal formulations or compositions, e.g., conventional pesticidal dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g., conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g., benzene, toluene, xylene, etc.), halogenated, especially chlorinated, aromatic hydrocarbons (e.g., chloro-benzenes, etc.), paraffins (e.g., petroleum fractions), chlorinated aliphatic hydrocarbons (e.g., methylene chloride, etc.), alcohols (e.g., methanol, ethanol, propanol, butanol, etc.), amines (e.g., ethanol-amine, etc.), ethers, ether-alcohols (e.g., glycol monomethyl ether, etc.), amides (e.g., dimethyl formamide, etc.), sulfoxides (e.g., dimethyl sulfoxide, etc.), ketones (e.g., acetone, etc.) and/or water; as well as inert dispersible finely divided solid carriers, such as ground natural minerals (e.g., kaolins, alumina, silica, chalk, i.e., calcium carbonate, talc, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides, rodenticides, or fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.00001–10 percent, preferably 0.01–1 percent, by weight of the mixture, Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.0001–95 percent, and preferably 0.01–95 percent, by weight of the mixture.

The active compounds can also be used in accordance with the well known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95 percent by weight of active compound of even the 100 percent active substance alone, e.g., about 20–100 percent by weight of the active compound.

Furthermore, the present invention contemplates methods of selectively killing, combating or controlling pests, e.g., arthropods, i.e., insects and acarids, and more particularly methods of combating at least one of insects and acarids which comprise applying to at least one of correspondingly (a) such insects, (b) such acarids, and (c) the corresponding habitat, i.e., the locus to be protected, a correspondingly combative or toxic amount, i.e., an arthropodicidally, especially insecticidally or acaricidally, effective amount, of the particular active compound of the invention alone or together with a carrier vehicle as noted above. The instant formulations or compositions are applied in the usual manner, for instance by spraying, atomizing, vaporizing, scattering, dusting, watering, sprinkling, pouring, fumigating, and the like (and even by poisoning of drinking water or by laying, above ground and below ground, food baits and play baits into which the active compounds are incorporated, as well as by fumigation in rooms or subterranean burrows).

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention is illustrated, without limitation, by the following examples:

EXAMPLE 1

Plutella Test
Solvent:    3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamond-back moth (*Plutella maculipennis*).

After the specified periods of time, the degree of destruction is determined as a percentage: 100 percent means that all the caterpillars are killed whereas 0 percent means that none of the caterpillars are killed.

The active compounds, the concentrations of the active compounds, the evaluation times and the results can be seen from the following Table 1.

TABLE 1.—PLUTELLA TEST

| Active compound (constitution) | Concentration of active compound in percent | Degree of destruction in percent after 3 days |
|---|---|---|
| (A) $(CH_3O)_2\overset{S}{\overset{\|}{P}}-O-\text{[pyrazole-CH}_3\text{]}$ (known) | 0.1 | 0 |
| (B) $(C_2H_5O)_2\overset{S}{\overset{\|}{P}}-O-\text{[pyrazole-CH}_3\text{]}$ (known) | 0.1 / 0.01 | 100 / 0 |
| (2) $(C_2H_5O)_2\overset{S}{\overset{\|}{P}}-O-\text{[N-N-CH}_3\text{/S ring]}$ | 0.1 / 0.01 / 0.001 | 100 / 100 / 95 |
| (3) $(C_2H_5O)_2\overset{O}{\overset{\|}{P}}-O-\text{[N-N-CH}_3\text{/S ring]}$ | 0.1 / 0.01 | 100 / 100 |
| (4) $CH_3(iC_3H_7O)\overset{S}{\overset{\|}{P}}-O-\text{[N-N-CH}_3\text{/S ring]}$ | 0.1 / 0.01 | 100 / 100 |
| (5) $CH_3(\text{sec.}C_4H_9O)\overset{S}{\overset{\|}{P}}-O-\text{[N-N-CH}_3\text{/S ring]}$ | 0.1 / 0.01 | 100 / 100 |
| (1) $C_2H_5(C_2H_5O)\overset{S}{\overset{\|}{P}}-O-\text{[N-N-CH}_3\text{/S ring]}$ | 0.1 / 0.01 | 100 / 100 |
| (6) $(CH_3O)_2\overset{S}{\overset{\|}{P}}-O-\text{[N-N-CH}_3\text{/S ring]}$ | 0.1 / 0.01 | 100 / 100 |
| (7) $C_2H_5O(C_6H_5)\overset{S}{\overset{\|}{P}}-O-\text{[N-N-CH}_3\text{/S ring]}$ | 0.1 / 0.01 | 100 / 100 |
| (8) $C_2H_5O(iC_3H_7-NH)\overset{O}{\overset{\|}{P}}-O-\text{[N-N-CH}_3\text{/S ring]}$ | 0.1 / 0.01 | 100 / 100 |

EXAMPLE 2

Myzus Test (Contact Action)
Solvent:    3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100 percent means that all the aphids are killed whereas 0 percent means that none of the aphids are killed.

The active compounds, the concentrations of the active compounds, the evaluation times and the results can be seen from the following Table 2.

TABLE 2.—MYZUS TEST

| Active compound | Concentration of active compound in percent | Degree of destruction in percent after 24 hours |
|---|---|---|
| (A) $(CH_3O)_2P(S)-O-$[pyrazole-CH_3] (known) | 0.1 | 0 |
| (B) $(C_2H_5O)_2P(S)-O-$[pyrazole-CH_3] (known) | 0.1 / 0.01 | 100 / 30 |
| (2) $(C_2H_5O)_2P(S)-O-$[N—N—CH_3 / N—S triazolothiazole] | 0.1 / 0.01 / 0.001 / 0.0001 | 100 / 100 / 100 / 40 |
| (3) $(C_2H_5O)_2P(O)-O-$[ring] | 0.1 / 0.01 / 0.001 | 100 / 100 / 85 |
| (4) $CH_3, iC_3H_7O$-P(S)-O-[ring] | 0.1 / 0.01 / 0.001 | 100 / 100 / 98 |
| (5) $CH_3, sec.C_4H_9O$-P(S)-O-[ring] | 0.1 / 0.01 | 100 / 100 |
| (1) $C_2H_5, C_2H_5O$-P(S)-O-[ring] | 0.1 / 0.01 / 0.001 | 100 / 100 / 99 |
| (6) $(CH_3O)_2P(S)-O-$[ring] | 0.1 / 0.01 / 0.001 / 0.0001 | 100 / 100 / 90 / 40 |
| (8) $C_2H_5O, iC_3H_7-NH$-P(O)-O-[ring] | 0.1 / 0.01 | 100 / 100 |

EXAMPLE 3

Tetranychus Test
    Solvent: 3 parts by weight acetone
    Emulsifier: 1 part by weight alkylarylpolyglycol ether To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100 percent means that all the spider mites are killed whereas 0 percent means that none of the spider mites are killed.

The active compounds, the concentrations of the active compounds, the evaluation times and the results can be seen from the following Table 3.

TABLE 3.—TETRANYCHUS-TEST

| Active compound (Constitution) | Concentration of active compound in percent | Degree of destruction in percent after 2 days |
|---|---|---|
| (A) $(CH_3O)_2P(S)-O-$[pyrazole-CH_3] (known) | 0.1 | 0 |
| (B) $(C_2H_5O)_2P(S)-O-$[pyrazole-CH_3] (known) | 0.1 | 0 |
| (2) $(C_2H_5O)_2P(S)-O-$[triazolothiazole-CH_3] | 0.1 / 0.01 | 100 / 100 |
| (3) $(C_2H_5O)_2P(O)-O-$[ring] | 0.1 / 0.01 | 100 / 95 |
| (4) $CH_3, iC_3H_7O$-P(S)-O-[ring] | 0.1 / 0.01 | 98 / 90 |
| (5) $CH_3, sec.C_4H_9O$-P(S)-O-[ring] | 0.1 / 0.01 | 100 / 98 |
| (1) $C_2H_5, C_2H_5O$-P(S)-O-[ring] | 0.1 / 0.01 | 100 / 90 |
| (6) $(CH_3O)_2P(S)-O-$[ring] | 0.1 / 0.01 | 100 / 99 |
| (8) $C_2H_5O, iC_3H_7-NH$-P(O)-O-[ring] | 0.1 | 95 |

The following further examples are set forth to illustrate, without limitation, the process for producing the active compounds according to the present invention.

EXAMPLE 4

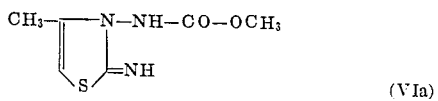

(1)

47g (0.3 mole) of 2-hydroxy-5-methylthiazolo(3,2-b)-s-triazole are stirred together with 45g of potassium carbonate and 42g of 0-ethylethanethionophosphonic acid ester chloride in 300 ml of acetonitrile at 40° to 50° C for 3 hours. The mixture is then poured into water and extracted with benzene. The benzene phase is dried, the solvent is evaporated and the residue is slightly distilled. The yield is 68g (= 78 percent of the theory). The 0-ethyl-ethane-0-[5-methyl-thiazolo-(3,2-b)-s-triazol-2-yl]-thionophosphonic acid ester possesses a refractive index $n_D^{24}$ of 1.5610.

Calc. for $C_9H_{14}O_2N_3S_2P$
(molecular weight 291):          S 22%
Found                                 S 22.12%

The 2-hydroxy-5-methylthiazolo(3,2-b)-s-triazole required as starting material can be obtained for example as follows:

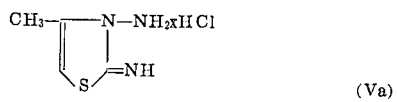

(VIa)

50 g (0.4 mole) of the product of the formula

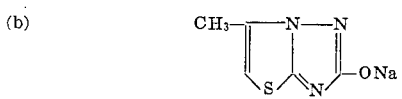

(Va)

(prepared according to "Berichte der Deutschen Chemischen Gesellschaft," Vol. 87, page 1391) are dissolved in 400 ml of 1 N solution of sodium hydroxide, 40g chloroformic acid methyl ester are added to the solution at 20° to 30° C and it is stirred for 2 hours. The reaction product is then filtered off with suction and dried. The yield of VIa is 60 percent of the theory, the melting point is 150° C.

(b)

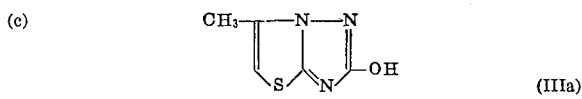

(VIIa)

80g of the product obtained under (a) are stirred in 400 ml benzene together with 0.4 mole of sodium methylate at 50° C for 12 hours. The mixture is then cooled, and ether is added. The precipitated crystals are filtered off with suction and dried. The yield of VIIa is 64g (= 90 percent of the theory).

Calc. for $C_5H_4ON_3SNa$
(molecular weight 177):          Na 13%
Found:                             Na 13.04%

(c)

(IIIa)

36g (0.2 mole) of the product according to (b) are dissolved in 50 ml of water, and the free hydroxy compound is precipitated with 12g of glacial acetic acid. After the precipitate has stood for 2 hours at 0° C, it is filtered off with suction and recrystallized from a methanol-acetone mixture. The yield is 50% of the theory. The 2-hydroxy-5-methylthioazolo(3,2-b)-s-triazole (IIIa) melts at 181° C.

In a manner analogous to that described above, the following compounds can be prepared:

| Formula | Physical properties |
|---|---|
| (3) $(C_2H_5O)_2\overset{O}{\overset{\|}{P}}-O-$ [ring] $-CH_3$ | $n_D^{21}=1.5085$ |
| (5) sec. $C_4H_9O$, $CH_3$, $\overset{S}{\overset{\|}{P}}-O-$ [ring] $-CH_3$ | $n_D^{21}=1.5570$ |
| (4) $iC_3H_7O$, $CH_3$, $\overset{S}{\overset{\|}{P}}-O-$ [ring] $-CH_3$ | $n_D^{21}=1.5567$ |
| (2) $(C_2H_5O)_2\overset{S}{\overset{\|}{P}}-O-$ [ring] $-CH_3$ | $n_D^{20}=1.5476$ |
| (6) $(CH_3O)_2\overset{S}{\overset{\|}{P}}-O-$ [ring] $-CH_3$ | $n_D^{20}=1.5562$ |
| (8) $iC_3H_7NH$, $C_2H_5O$, $\overset{O}{\overset{\|}{P}}-O-$ [ring] $-CH_3$ | M.P., 70 to 72° C. |
| (9) $(CH_3)_2\overset{S}{\overset{\|}{P}}-O-$ [ring] $-CH_3$ | M.P., 104° C. |
| (7) $C_2H_5O$, $C_6H_5$, $\overset{S}{\overset{\|}{P}}-O-$ [ring] $-CH_3$ | |
| (10) $iC_3H_7NH$, $C_2H_5O$, $\overset{S}{\overset{\|}{P}}-O-$ [ring] $-CH_3$ | M.P., 98 to 102° C. |

It will be realized that all of the foregoing compounds contemplated by the present invention possess the desired selective pesticidal, especially arthropodicidal, i.e., insecticidal or acaricidal, properties for combating insects and acarids, and that such compounds have not only a very slight toxicity toward warm-blooded creatures, but also a concomitantly low phytotoxicity.

As may be used herein, the terms "arthropod," "arthropodicidal and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. Triazolo-thiazole esters of the general formula

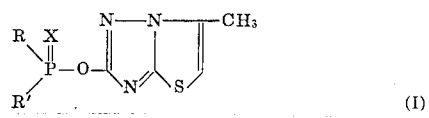

in which
each of R and R', which may be the same or different, stands for a straight-chain or branched alkyl, alkoxy or alkylamino radical with, in each case, one to six carbon atoms, or a phenyl group, and
X stands for an oxygen or sulphur atom.

2. Esters according to claim 1 in which R stands for lower alkoxy, and R' stands for lower alkoxy, lower alkylamino, phenyl, methyl or ethyl.

3. Compound according to claim 1 wherein such compound is 0,0-diethyl-0-[2-hydroxy-5-methylthiazole(3,2-b)-s-trazole]-thionophosphoric acid ester of the formula

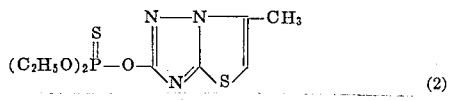

4. Compound according to claim 1 wherein such compound is 0,0-diethyl-0-[2-hydroxy-5-methylthiazolo(3,2-b)-s-triazole]-phosphoric acid ester of the formula

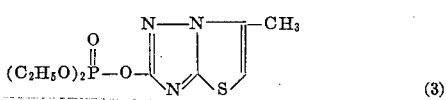

5. Compound according to claim 1 wherein such compound is 0-isopropyl-methane-0-[2-hydroxy-5-methylthiazolo(3,2-b)-s-triazole]-thionophosphonic acid ester of the formula

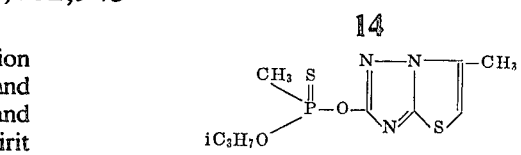

6. Compound according to claim 1 wherein such compound is 0-sec. butyl-methane-0-[2-hydroxy-5-methylthiazolo(3,2-b)-s-triazole]-thiophosphonic acid ester of the formula

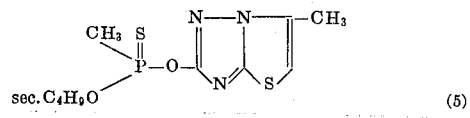

7. Compound according to claim 1 wherein such compound is 0-ethyl-ethane-0-[2-hydroxy-5-methylthiazolo(3,2-b)-s-triazole]-thionophosphonic acid ester of the formula

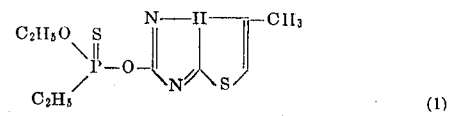

8. Compound according to claim 1 wherein such compound is 0,0-dimethyl-0-[2-hydroxy-5-methylthiazolo(3,2-b)-s-triazole]-thionophosphoric acid ester of the formula

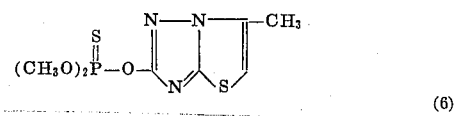

9. Compound according to claim 1 wherein such compound is 0-ethyl-N-isopropyl-0-[2-hydroxy-5-methylthiazolo(3,2-b)-s-triazole]-phosphoric acid ester amide of the formula

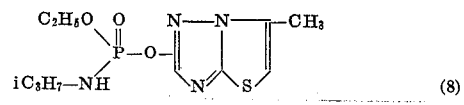

* * * * *

UNITED STATES PATENT OFFICE
CERTIFICATE OF CORRECTION

Patent No. 3,682,943  Dated August 8, 1972

Inventor(s) Hellmut Hoffmann et al

It is certified that error appears in the above-identified patent and that said Letters Patent are hereby corrected as shown below:

Abstract, first line

Insert "s-" following -- (3,2-b)- --.

Col. 1, line 6

"S" should be -- s --.

Col. 1, line 56

"(3,2b)" should be -- (3,2-b) --.

Col. 2, line 36

"Oethyl" should be -- O-ethyl --.

Col. 7, Table 1

" 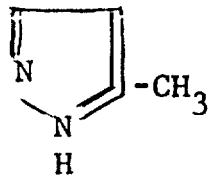 "  should be --  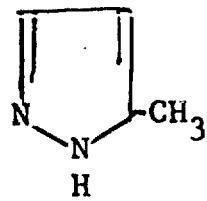  --

UNITED STATES PATENT OFFICE
CERTIFICATE OF CORRECTION

Patent No. 3,682,943          Dated August 8, 1972

Inventor(s) Hellmut Hoffmann et al          - 2 -

It is certified that error appears in the above-identified patent and that said Letters Patent are hereby corrected as shown below:

Col. 11, line 1

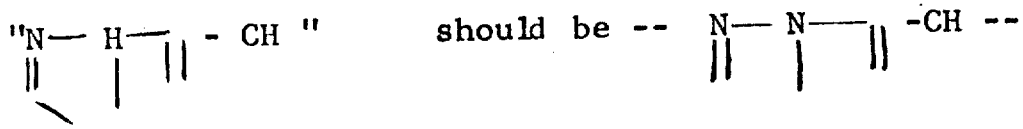

Claims 3 to 9 inclusive, lines 2-3 of each, for "[2-hydroxy-5-methylthiazolo(3.2-b)-s-triazole]"

substitute -- [5-methyl-thiazolo-(3,2-b)-s-triazol-2-yl] --.

Signed and sealed this 9th of January 1973.

(SEAL)
Attest:

EDWARD M. FLETCHER, JR.
Attesting Officer

ROBERT GOTTSCHALK
Commissioner of Patents